United States Patent Office 3,244,651
Patented Apr. 5, 1966

3,244,651
STABILIZATION OF ACROLEIN HOMOPOLYMERS AND DERIVATIVES THEREOF WITH EPOXIDES
Calvin E. Pannell, Lafayette, Calif., assignor to Shell Oil Company, New York, N.Y., a corporation of Delaware
No Drawing. Filed July 18, 1960, Ser. No. 43,341
9 Claims. (Cl. 260—23)

This invention relates to the stabilization of polymers of unsaturated aldehydes and their derivatives. More particularly, the invention relates to a novel process for stabilizing polymers of unsaturated aldehydes and derivatives against deterioration by light and heat, and to the stabilized products obtained thereby.

Specifically, the invention provides an economical and highly efficient process for stabilizing polymers of unsaturated aldehydes and derivatives, such as, for example, polymers of acrolein, and their derivatives such as their water-soluble derivatives against deterioration by light and heat which comprises incorporating with the said polymers or derivatives a material possessing at least one vice-poxy group, and preferably a diepoxide such as a glycidyl polyether of a dihydric phenol. The invention further provides stable compositions produced by this process.

It is known that unsaturated aldehydes such as acrolein can be polymerized to form solid polymers known as "disacryl." These polymers are insoluble in water and solvents and find little practical utility as such. These polymers can, however, be converted to soluble derivatives by treatment with materials, such as sulfur dioxide, which find use in many applications. The usefulness of these soluble derivatives, however, has been limited by the fact that they have rather poor stability to light and heat and on extended exposure thereto begin to darken and become embrittled.

It is an object of the invention, therefore, to provide a method for stabilizing polymers of unsaturated aldehydes. It is a further object to provide a method for stabilizing polymers of unsaturated aldehydes and their water-soluble derivatives against decompositions by heat and light. It is a further object to provide a method for stabilizing polyacroleins and their soluble derivatives. It is a further object to provide compositions comprising polymers of unsaturated aldehydes and epoxy-containing materials. It is a further object to provide compositions containing polyacroleins and their derivatives which are stabilized against heat and light. Other objects and advantages of the invention will be apparent from the following detailed description thereof.

It has now been discovered that these and other objects may be accomplished by the process of the invention comprising mixing a polymer of the unsaturated aldehyde, such as, for example, a polyacrolein, or a derivative such as, for example, a $SO_2$-water soluble derivative, with a stabilizing amount of a material possessing at least one vic-epoxy group, and preferably a diepoxide such as a glycidyl polyether. It has been found that by the addition of the above-noted epoxy compounds the polymers of the unsaturated aldehydes and their derivatives can be stabilized against discoloration and decomposition by heat and light for extended periods of time. In addition, compositions containing the epoxides and particularly the polyepoxides have been found to have improved flexibility and distensibility, the additive thus acting both as a stabilizer and as a plasticizer.

The polymers of acrolein to be used in the process of the invention are the addition-type polymers obtained by polymerization through the double bonds. The polymers include the homopolymers of acroleins as well as the copolymers of acrolein with other unsaturated materials, and preferably those containing conjugated ethylenic linkages, such as butadiene, isoprene, methylpentadiene, chloroprene, and the like, and those containing a single $CH_2=C$ group, such as ethylene, propylene, isobutylene, octene, vinyl acetate, vinyl propionate, vinylpyridine, vinylnaphthalene, styrene, vinylcyclohexane, acrylonitrile, methacrylonitrile, vinyl chloride, vinylidene chloride, acrylate esters, such as, for example, methyl methacrylate, ethyl acrylate, ethyl methacrylate, butyl acrylate, and allylic compounds, such as allyl acetate, allyl alcohol, allyl butyrate, allyl benzoate, allyl cycohexanecarboxylate, allylamine, and the like. These additional monomers are employed only in minor amounts, and in amounts preferably ranging from 1% to 40%, and preferably in amounts ranging from about 1% to 25% by weight.

The polymers of acrolein employed may have molecular weights as low at 1000, but preferred polymers are those of high molecular weight and still more preferably those having molecular weights ranging from about 75,000 to 2,000,000, and more preferably between 100,000 and 1,000,000, as determined by the light scattering technique. The molecular weight ranges also may be indicated by intrinsic viscosity values as these are the more easily determined. Preferred polymers are those having intrinsic viscosities (as determined on the solubilized form of the polymer) of at least 0.6 and preferably 0.9 to 5.0. These values are determined by the conventional technique of polyelectrolyte viscosity measurements at 25° C.

The preferred polymers are those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

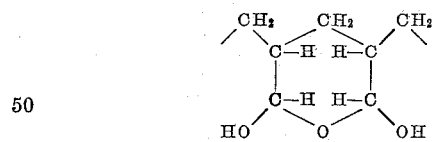

and some

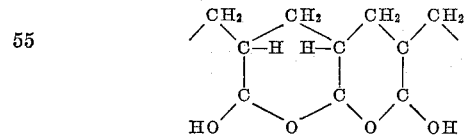

Many of the preferred polymers are also insoluble in water and insoluble in conventional solvents, such as benzene, toluene, acetone, and the like. They may be used as such or they may be converted to the soluble form as by treatment with various materials, such as sulfur dioxide, sodium sulfite, mercaptans, alcohols and the like.

The above-described acrolein polymers may be prepared by a variety of different methods. They may be prepared, for example, by heating the acrolein with free radical catalysts, such as peroxides as benzoyl peroxide, tertiary butyl hydroperoxide, tertiary butyl perbenzoate, tertiary butyl peracetate and the like, in bulk, emulsion or suspension systems.

Conversion of the water-insoluble polymers to soluble form may be accomplished by a variety of methods. The conversion is preferably accomplished by suspending the high molecular weight polymer in an aqueous solution containing the water-solubilizing agent, such as, for example, sulfur dioxide or an alkali bisulfite as sodium bisulfite. The amount of polymer added will vary depending on the particular agent involved and concentration of the agent. In general, it is preferred to add from 1 to 50 parts of the polymer of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalysts or the addition of swelling agents, such as acetone, tetrahydrofuran, etc. may also be employed in the dissolution.

High molecular weight acrolein polymers and their soluble forms which give outstanding results in the process of the invention are described and claimed in copending patent application Serial No. 859,156, filed December 14, 1959, now U.S. Patent No. 3,079,357, and copending application Serial No. 859,154, filed December 14, 1959, now U.S. Patent No. 3,167,529, and so much of the disclosure of these two applications relative to these polymers and derivatives and their preparation is incorporated into this application.

The preparation of some of the acrolein polymers by the above-noted method is illustrated below.

POLYMER A 100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetraacetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetraacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetraacetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for 6 hours with stirring and under an atmosphere of nitrogen. The resulting 46 parts product was a white powder polymer having an intrinsic viscosity of 1.02 dl./g.

POLYMER E 10 parts of the solid Polymer A prepared as above was added to aqueous SO$_2$ solution and the mixture heated to 50° C. After a few minutes, the polymer dissolved to form a clear solution. Analysis indicated the polymer contained plurality of structural units

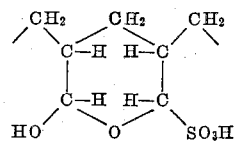

POLYMER F 10 parts of the solid Polymer B prepared as above was added to water to form a suspension thereof. Sodium bisulfite was then added and the mixture heated to 50° C. After a few minutes, the polymer dissolved to form a clear solution. Analysis indicated the polymer contained plurality of structural units

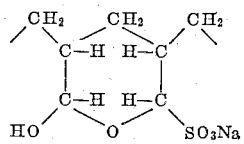

The epoxy containing materials to be utilized as stabilizers in the process of the invention are those compounds possessing at least one vic-epoxy group, i.e., at least one

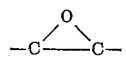

group. These compounds may be organic or inorganic and may be saturated or unsaturated, aliphatic or cycloaliphatic, aromatic or heterocyclic, and may be monomeric or polymeric. The compounds may also be substituted with non-interfering substituents, such as hydroxyl groups, hydrogen atoms, ether radicals and the like. Examples of epoxy-containing organic materials are epoxypropane, 1-hydroxy-2,3-epoxypropane, 1-chloro-2,3-epoxypropane, 1,2-epoxybutane, 2,3-epoxybutane, 4-chloro-1,2-epoxypentane, allyloxy-2,3-epoxypropane, dodecoxy-2,3-epoxypropane, 1,2-epoxyhexene-1, phenoxy-2,3-epoxypropane, 1,6-dichloro-2,3-epoxyhexane, butenoxy-2,3-epoxypropane, naphthoxy-2,3-epoxypentane, 1,4-bis(2,3-epoxypropoxy)benzene, benzene, 1,3-bis(2,3-epoxypropoxy)benzene, 1,3-bis(3,4-epoxybutoxy)benzene, glycidyl stearate, glycidyl caproate, 1,3,5-tris(3,4-epoxybutoxy)benzene, 1,3-bis(3,4-epoxybutoxy)-5-(2,3-epoxypropoxy)benzene, 2,5,7-tris(2,3-epoxypropoxy)benzene, 4,4'-bis(2,3-epoxypropoxy)diphenyl ether, 1,3-bis(3,4-epoxypentoxy)benzene, 1,8-bis(2,3-epoxypropoxy)octane, 1,4-bis(2,3-epoxypropoxy)cyclohexane, 1,3-bis(2,3-epoxybutoxy)cyclopentane, 4,4'-bis(2,3-epoxypropoxy)diphenyl-dimethylmethane, 4,4'-bis(2-hydroxy-3,4-epoxybutoxy)diphenyl-dimethylmethane, 1,3-bis(2,3-epoxypentoxy)-5-chlorobenzene, 1,3-bis(2,3-epoxybutoxy)-5-bromobenzene, 1,3-bis(2,3-epoxypropoxy)-5,6-dichlorooctane, 1,4-bis(2,3-epoxybutoxy)-2-chlorocyclohexane, 1,4-bis(2,3-epoxypropoxy)-2-cyclohexene, 1,4-bis(2,3-epoxypentoxy)-3-bromocyclopentane, the polyepoxy polyhydroxy polyethers obtained by reacting a polyhydroxyl alcohol with a polyepoxide, such as 1,3-bis(2- hydroxy-3,4-epoxybutoxy)benzene, 1,4-bis(2-hydroxy-4,5-epoxypentoxy)benzene, 1,3 - bis(2-hydroxy-3,4-epoxybutoxy)propane, 1,2,3-tri(3,4-epoxypentoxy)propane, 1,2,3,4-tetra(2-hydroxy-3,4-epoxybutoxy)butane, the reaction product of 1 mole of glycerol and 3 moles of bis(2,3-epoxypropyl)ether, the reaction product of sorbitol and 6 moles of bis(2,3-epoxy-2-methylpropyl)ether, and the reaction product of 1 mole of pentaerythritol and 5 moles of 1,2-epoxy-4,5-epoxypentane.

Further examples are the polymeric epoxides formed by reacting a polyhydric alcohol with a sufficient excess of a polyepoxide or a halogen-containing epoxide, preferably in the presence of an alkaline catalyst. Examples of such polyhydric alcohols are resorcinol, catechol, bisphenol-(2,2'-di-p-phenylpropane), 4,4' - dihydroxydiphenylmethane, bis(2,2'-dihydroxydinaphthyl)methane, the polyhydroxy naphthenes, propylene glycol, trimethylene glycol, butylene glycol, glycerol, sorbitol, mannitol, pentaerythritol, and the ethylenically unsaturated or the halogen-containing polyhydric derivatives of any of the above types of polyhydric alcohols. The polyepoxides may be exemplified by 1,2-epoxy-3,4-epoxybutane, 1,2-epoxy-4,5-epoxypentane, bis(2,3-epoxypropyl)ether, bis(2,3-epoxybutyl)ether, bis(2,3-epoxy - 2 - methylpropyl)ether. The halogen-containing epoxides are exemplified by epichlorohydrin, 3-chloro-1,2-epoxybutane, 3-bromo-1,3-epoxyhexane, 3-chloro-1,2-epoxyoctane, and the like. Polymers of this type have structures analogous to that illustrated below for the particular case of the reaction between bisphenol and epichlorohydrin.

the invention include the epoxidized esters of unsaturated monohydric alcohols and polycarboxylic acids, such as, for example, di(2,3-epoxybutyl)adipate, di(2,3-epoxybutyl)oxalate, di(2,3-epoxyheptyl)succinate, di(2,3-epoxybutyl)maleate, di(2,3 - epoxyoctyl)pimelate, di(2,3-epoxypropyl)phthalate, di(2,3-epoxycyclohexyl)adipate, di(2,3 - epoxypentyl)triodipropionate, di(5,6-epoxytetradecyl)diphenyldicarboxylate, di(3,4 - epoxyheptyl)sulfonyldibutyrate, tri(2,3-epoxypropyl) 1,2,4-butanetricarboxylate, di(5,6-epoxypentadecyl)tartarate, di(4,5-epoxytetradecyl)maleate, di(3,4 - epoxybutyl)citrate, and di(4,5 - epoxyoctadecyl)malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4,-epoxypentanoate, 3,4-epoxycyclohexyl 3,4,-epoxycyclohexanoate, 3,4,-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11, 12-diepoxyoctadecanedioate, dioctyl 10,11-diethyl-8,9,12, 13 - diepoxy-eicosanedioate, dihexyl 6,7,10,11-diepoxy-

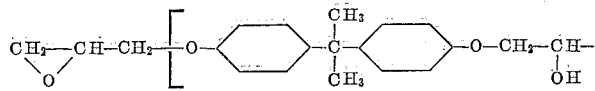 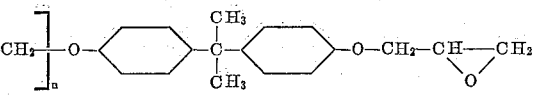

wherein *n* represents an integer greater than one.

Other examples of this group of materials are the polymers and copolymers of the epoxy-containing monomers possessing at least one polymerizable aliphatic carbon-to-carbon multiple bond, such as an ethylenic group $>C=C<$. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. The monomers may polymerize with themselves or with other ethenoid monomers, particularly the vinyl-type monomers, i.e., those containing at least one $>CH_2=C<$ group, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate.

Illustrative examples of these polymers and copolymers containing the epoxy groups are poly(allyl-2,3-epoxypropylether), poly(2,3-epoxypropyl crotonate), allyl 2,3-epoxypropyl ether-styrene copolymer, methallyl 3,4-epoxybutyl ether-allyl benzoate copolymer, poly(4,5-epoxypentyl crotonate), poly(4,5-epoxypentyl acrylate), poly(2,3-epoxy propylcyclohexenoate), poly(vinyl-2,3-epoxypropylether), allyl glycidyl ether-vinyl acetate copolymer, poly(methallyl - 2,3 - epoxypropylether), poly(allyl-1-methyl - 2,3-epoxypropylether), poly(4-glycidyloxy - styrene), poly(1-vinyl-2-pentadecenyl glycidyl ether), and poly(tiglyl-3,4-epoxybutyl ether).

Other examples include epoxidized esters of polyethylenically unsaturated monocarboxylic acids, such as epoxidized linseed, soybean, perilla, oiticia, tung, walnut and dehydrated castor oil, methyllinoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed, and the like.

Another group of polyepoxides useful in the process of hexanedecanedioate, didecyl 9 - epoxy-ethyl-10,11-epoxyoctadecanedioate, dibutyl 3 - butyl-3,4,5,6-diepoxycyclohexane-1,2-dicarboxylate, dicyclohexyl 3,4,5,6-diepoxycyclohexane - 1,2-dicarboxylate, dibenzyl 1,2,4,5-diepoxycyclohexane - 1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2, 2-bis(2-cyclohexenyl)propane, epoxidized vinyl cyclohexene and epoxidized dimer of cyclopentadiene.

Illustrative examples of a particularly preferred group of compounds are 1,4-bis(2,3-epoxypropoxy)benzene, 1,3-bis(2,3 - epoxypropoxy)benzene, 1,3-bis(2,3-epoxybutoxy)-benzene, 4,4' - bis(2,3-epoxypropoxy)diphenyl-dimethylmethane, 1,3 - bis(2 - hydroxy-3,4-epoxybutoxy)benzene, 1,2,3 - tri(2-hydroxy-3,4-epoxypentoxy)naphthalene, the polymer obtained by reacting resorcinol with epichlorohydrin, the polymer prepared by reacting resorcinol with bis-(2,3-epoxypropyl)ether, the polymer prepared by reacting sorbitol with epichlorohydrin, poly(allyl 2,3-epoxypropylether) and poly(2,3-epoxypropyl crotonate).

The most suitable epoxy-containing organic materials are those containing only C, H and O and having a low degree of evaporation from the stabilized compositions, e.g., those having a boiling point above 250° C.

The amount of the epoxy containing material to be employed in the process of the invention may vary over a considerable range depending upon the particular agent selected and the material to be stabilized. In general, the amount of the epoxy containing material may vary from as little as .5% to as high as 100–150% by weight of the material to be stabilized. Preferred amounts of the epoxy containing materials to employed vary from about 85–125% by weight of the material to be stabilized.

The stabilization may be accomplished by mixing the epoxy material directly with the polymer of the unsaturated aldehyde or derivative thereover. The polymer or derivative may be used as such or it may be used in solvent solution or in an aqueous system. The water-soluble derivatives, such as the $SO_2$ derivatives, are preferably used in an aqueous system. The epoxy may also be added as such or in the form of a solvent or aqueous solution.

After combination, the components should be thoroughly mixed as by stirring, blending on rolls and the like.

Modifying agents such as plasticizers, pigments and fillers may be added to the material to be stabilized before, at the same time as, or after the addition of the polyexpoides.

The stabilized materials may be utilized in the formation of coatings, castings, impregnating agents for paper, cloth, leather and the like.

The following examples are given to illustrate the process of the invention. It should be understood that the examples are given for the purpose of illustration and the invention is not to be regarded as limited to any of the specific conditions recited therein. Unless otherwise indicated, parts in the examples are parts by weight.

Example I

This example illustrates the preparation and properties of compositions containing an $SO_2$ solubilized polyacrolein and diglycidyl ether.

A 10% water solution of $SO_2$ solubilized polyacrolein having an intrinsic viscosity of 1.0 dl./g. prepared as shown above was combined with amounts of diglycidyl ether as shown in the following table. The mixtures were stirred and spread out on glass panels and allowed to dry in air. The resulting films were hard and had good strength and distensibility. When placed in a Fadometer for 400 hours, the coatings were much lighter color than the control. The results are shown in the table below:

| Amount of diglycidyl ether a | 0 | 10 | 25 | 35 |
|---|---|---|---|---|
| Appearance of dried film. | Light yellow. | Trace yellow. | Colorless. | Colorless. |
| Appearance after UV exposure. | Deep amber. | Very light amber. | Very light yellow. | Very light yellow. | a Parts per hundred of the polyacrolein derivative.

Example II

Example I was repeated with the exception that the stabilizing material employed was glycidol and it was employed in amounts varying from 50 to 100 parts per hundred parts of the polyacrolein derivative. In both cases stabilization to discoloration was obtained.

Example III

This example illustrates the preparation and properties of a composition containing an $SO_2$ solubilized polyacrolein and diglycidyl ether of 2,2-bis(4-hydroxyphenyl)propane.

A butanol solution of 100 parts of a sulfur dioxide-solubilized polyacrolein having an intrinsic viscosity of 1.0 dl./g. was prepared. To this solution was added 50 parts of the diglycidyl ether of 2,2-bis(4-hydroxyphenyl)propane and the mixture stirred at room temperature. In a short while, the mixture was spread out on glass panels and allowed to dry in air. The resulting films were hard and had good strength and distensibility and good resistance to discoloration by heat and light.

Example IV

Example III is repeated with the exception that the diglycidyl ether of 2,2-bis(4-hydroxyphenyl)propane is replaced by an equivalent amount of poly(allyl glycidyl ether). Related results are obtained.

Example V

A butanol solution of 100 parts of a sulfur dioxide-solubilized polyacrolein having an intrinsic viscosity of 1.0 dl./g. was prepared. To this solution was added 50 parts of epoxidized methyl cyclohexenyl methyl cyclohexene-carboxylate and the mixture stirred at room temperature. In a short while, the mixture was spread out on glass panels and heated at 100° C. for 20 minutes. A control sample which did not contain the epoxidized ester was quite discolored at the end of 20 minutes while the stabilized sample was only slightly yellow.

Example VI

Example III is repeated with the exception that the diglycidyl ether of 2,2-bis(4-hydroxyphenyl)propane is replaced by allyl glycidyl ether and phenyl glycidyl ether. Related results are obtained.

Example VII

Examples I to III are repeated with the exception that the polyacrolein derivative is replaced by Polymer E defined above. Related results are obtained.

Example VIII

Examples I to IV are repeated with the exception that the polyacrolein derivative is replaced by Polymer F defined above. Products having good stability to light and heat are obtained.

Example IX

A butanol solution of a sulfur dioxide-solubilized polyacrolein having an intrinsic viscosity of 1.5 ($SO_2$ derivative of Polymer C described above) is prepared. To this solution is added 40 parts of diglycidyl ether of resorcinol and the mixture stirred at room temperature. In a short while, the mixture is spread out on glass panels and allowed to dry in air. The resulting films are hard and have improved resistance to discoloration by heat and light.

Example X

Example IX is repeated with the exception that the diglycidyl ether is replaced by epoxidized soybean oil. Related results are obtained.

Example XI

Example IX is repeated with the exception that the diglycidyl ether is replaced by epoxidized dicrotyl phthalate. Related results are obtained.

I claim as my invention:

1. A composition comprising (1) a member of the group consisting of homopolymers of acrolein resulting from the polymerization through the double bond of the acrolein molecule, and polymeric products obtained by reacting the aforedescribed homopolymers of acrolein with a member of the group consisting of sulfur dioxide, alkali metal bisulfites and sodium sulfite and, (2) a stabilizing amount of a compound containing at least one vic-epoxy group.

2. A composition comprising a polyacrolein-bisulfite adduct obtained by reacting a homopolymer of acrolein obtained by polymerization at the double bond of the acrolein molecule with an alkali metal bisulfite and a stabilizing amount of an organic compound containing at least one vic-epoxy group.

3. A composition as in claim 2 wherein the epoxide is a polyepoxide having an epoxy equivalency greater than 1.0.

4. A composition as in claim 2 wherein the polymer of acrolein is a polyacrolein having an intrinsic viscosity above 0.90 dl./g.

5. A composition as in claim 2 wherein the epoxide is diglycidyl ether.

6. A composition as in claim 2 wherein the epoxide is a diglycidyl ether of a dihydric phenol.

7. A composition as in claim 2 wherein the epoxide is a glycidyl ether of a polyhydric alcohol.

8. A composition as in claim 2 wherein the epoxide is an epoxidized drying oil.

9. A composition as in claim 2 wherein the epoxide is allyl glycidyl ether.

References Cited by the Examiner

UNITED STATES PATENTS

| | | | |
|---|---|---|---|
| 2,895,945 | 7/1959 | Fischer et al. | 260—837 |
| 2,919,259 | 12/1959 | Naylor et al. | 260—45.8 |
| 2,924,583 | 2/1960 | Starcher et al. | 260—45.8 |
| 2,927,934 | 3/1960 | Greenspan et al. | 260—18 |
| 2,945,837 | 7/1960 | Eifert et al. | 260—45.9 |
| 2,972,589 | 2/1961 | Steckler | 260—18 |
| 2,975,156 | 3/1961 | Fekete | 260—88.3 |
| 2,978,463 | 4/1961 | Kuester et al. | 260—18 |
| 3,008,914 | 11/1961 | Fry | 260—837 |
| 3,055,854 | 9/1962 | Piotrowski | 260—837 |
| 3,154,599 | 10/1964 | Wismer et al. | 260—860 |

FOREIGN PATENTS 797,459    7/1958    Great Britain.

MURRAY TILLMAN, *Primary Examiner.*

ALFONSO D. SULLIVAN, MILTON STERMAN, LEON J. BERCOVITZ, *Examiners.*

P. P. GARVIN, T. D. KERWIN, G. F. LESMES,
*Assistant Examiners.*